(12) United States Patent  
Howard

(10) Patent No.: US 7,705,585 B2  
(45) Date of Patent: Apr. 27, 2010

(54) INDUCTIVE DISPLACEMENT DETECTOR

(76) Inventor: Mark Anthony Howard, 17 Freckenham Rd., Worlington, Suffolk IP28 8SQ (GB)

( * ) Notice: Subject to any disclaimer, the term of this patent is extended or adjusted under 35 U.S.C. 154(b) by 0 days.

(21) Appl. No.: 12/162,153

(22) PCT Filed: Jan. 25, 2006

(86) PCT No.: PCT/GB2006/000231

§ 371 (c)(1),
(2), (4) Date: Dec. 29, 2008

(87) PCT Pub. No.: WO2006/079793

PCT Pub. Date: Aug. 3, 2006

(65) Prior Publication Data

US 2009/0174396 A1 Jul. 9, 2009

(51) Int. Cl.
*G01B 7/14* (2006.01)
(52) U.S. Cl. .............................. 324/207.17; 324/207.24
(58) Field of Classification Search ................................
324/207.15–207.17, 207.24, 256–258; 336/45; 340/870.31–870.32, 870.35–870.36
See application file for complete search history.

(56) References Cited

U.S. PATENT DOCUMENTS

| | | | |
|---|---|---|---|
| 6,011,389 | A | 1/2000 | Masreliez et al. |
| 6,124,708 | A | 9/2000 | Dames et al. |
| 6,335,618 | B1 | 1/2002 | Nahum |
| 2004/0169594 | A1* | 9/2004 | Ely et al. ...................... 341/22 |

FOREIGN PATENT DOCUMENTS

DE          39 10 597          10/1990

\* cited by examiner

*Primary Examiner*—Bot L LeDynh
(74) *Attorney, Agent, or Firm*—Renner, Otto, Boisselle & Sklar, LLP

(57) ABSTRACT

A detector for measuring relative position along a measurement path comprising: a passive, laminar electrical intermediate device extending along the measurement path wherein the extent of the said electrical intermediate device in an axis normal to the measurement path varies along the measurement axis; at least one laminar transmit winding and at least two laminar receive windings wherein the said at least two laminar receive windings are displaced from each other along the measurement path wherein each laminar receive winding is substantially electrically balanced with respect to the at least one laminar transmit winding; arranged such that the mutual inductance between at least one laminar transmit winding and at least two laminar receive windings indicates the relative position of the electrical intermediate device.

13 Claims, 9 Drawing Sheets

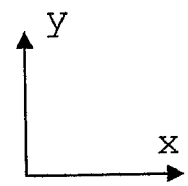
Figure 6a
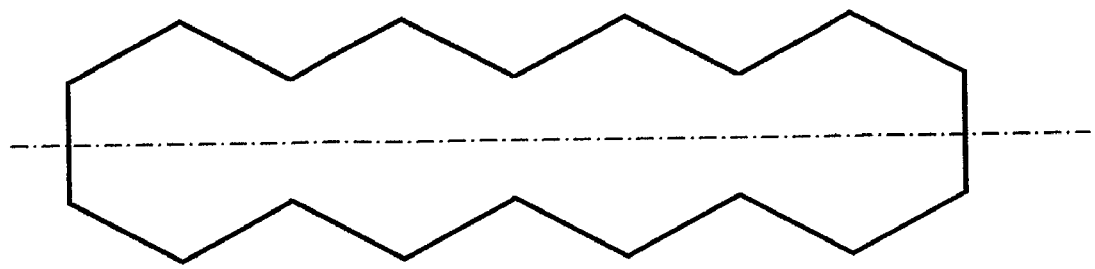
Figure 6b
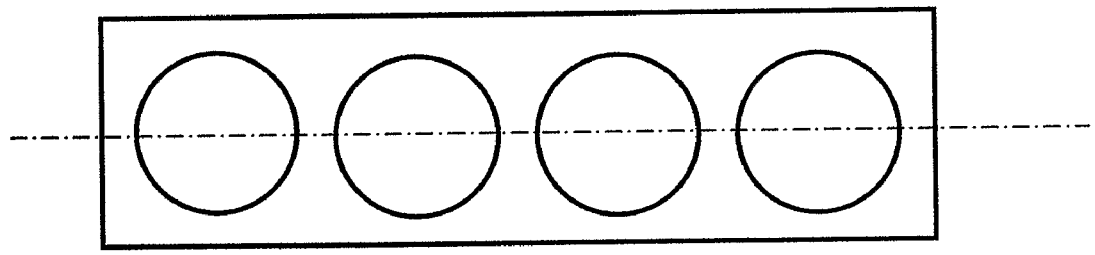
Figure 6c
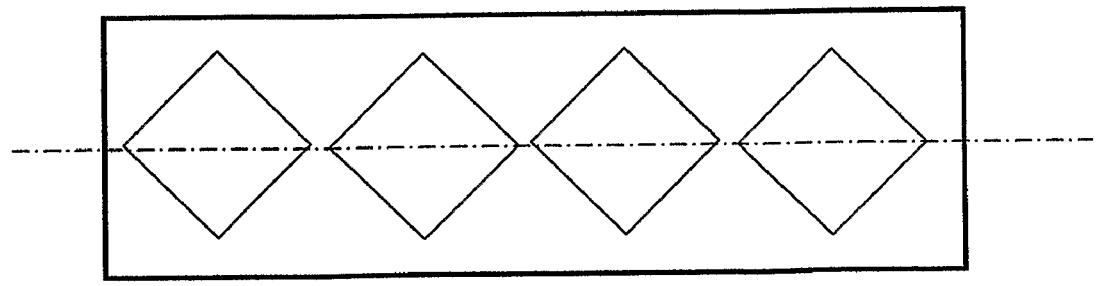

INDUCTIVE DISPLACEMENT DETECTOR

FIELD OF THE INVENTION

This invention relates to an inductive displacement detector, operable to measure the displacement of two relatively moveable bodies.

REVIEW OF THE ART KNOWN TO THE APPLICANT

Various forms of detector have been used to measure the position of two relatively moveable bodies. They are variously referred to as detectors, sensors, transducers, encoders, synchros, resolvers, measurement devices or systems.

A common form of detector is the linearly variable differential transformer (LVDT). Typically, in such devices, a magnetically permeable core moves relative to a set of primary and secondary windings. Linear forms are typically referred to as LVDTs and rotary forms are variously referred to as rotary variable differential transformers (RVDTs), synchros or resolvers. The electrical coupling between the windings varies in proportion to the position of the core. Such transformers have been used for many years and have a well-deserved reputation for accuracy. They are widely used in industrial and metrology applications. The transformer construction typically requires precision winding of large numbers of fine wire conductors. Consequently, they are expensive to produce, heavy and delicate. Such attributes prevent their widespread use.

In order to make such transformer constructions less expensive and heavy, Inductosyn Ltd. of Stockport, United Kingdom produced various products, dating from the 1960's, using laminar forms of linear and rotary transformers. In these, a first, laminar, serpentine winding is energised with an AC signal and moves relative to a second, laminar, serpentine winding. The degree of electrical coupling is indicative of the relative position of the two windings. Both sets of windings require an electrical connection. This greatly limits the scope for Inductosyns to those applications where both electrical connections can be maintained, for example, in low speed linear applications, rotary encoders with relatively small angular rotations or where slip rings are permissible.

Solutions to the problem of electrical connections to both parts of the detector have been marketed by Newall Measurements Ltd. of South Wigston, Leicestershire, England. Typically, in a Newall system, a series of precisely machined balls are arranged in a tube along an axis and are surrounded by a winding arrangement. As the winding arrangement traverses along the measurement axis, the inductance of the winding or mutual inductance between the windings varies in accordance with the position of the windings relative to the balls. The system cleverly utilises the tight tolerances to which balls for bearings are produced and has found commercial success in applications such as machine tool instrumentation. Nevertheless, the system suffers from a number of limiting problems. Firstly, variation of magnetic permeability (due to material composition differences between batches of balls or individual balls) needs to be tightly controlled in order not to provide erroneous measurement. Secondly, the relatively weak electromagnetic coupling requires that the windings are completely wrapped around the balls. This necessitates that any mechanical mountings can only be connected at the ends of the ball arrangement, otherwise there would be a mechanical clash between the windings and the mechanical mountings during traverse. Such a mounting arrangement causes the ball and tube arrangement to sag under its own weight, particularly on long traverses of >1 m. This sag can be problematic and a source of inaccuracy. The system is also relatively heavy and in its simplest form has an incremental rather than absolute measurement algorithm.

U.S. Pat. No. 4,737,698 discloses an inductive sensor in which a conductive target such as a copper disk moves relative to a laminar antenna carrying an arrangement of transmit and receive windings. FIG. 1 shows a schematic of the invention. Application of a high frequency input to the transmit winding [2c] results in a modulated output from the receive windings [2a & 2b] which may be demodulated to provide a signal indicative of the conductive target's [1] position relative to the receive windings [2a & 2b]. The invention is well suited to a repetitive or infinite arrangement of receive windings [2a or 2b] and a repetitive pattern of targets [1] (as shown in the U.S. Pat. No. 4,737,698's FIGS. 15, 17 & 19). Such arrangements might be used advantageously in a cylindrical geometry, for example. The invention described in U.S. Pat. No. 4,737,698 may used with single pitch receive windings [2a & 2b] arranged in phase quadrature (FIG. 28 in the U.S. Pat. No. 4,737,698) to provide absolute measurement over the winding pitch. In practice, erroneous measurements can occur as a conductive target [1] enters and leaves the sensor's field. Such a scenario is shown in this document's FIG. 1 for reference. These errors are due to end effects when the target [1] enters the right hand limit of the second receive winding [2b] and there is no possibility for the first winding [2a] to provide a second reading on which to base an absolute measurement. Further, the invention of U.S. Pat. No. 4,737,698 is not suitable for those geometries that need a short antennae [2] moving along a long linear range, e.g. a robot's gantry moving along a passive guide or track.

US 2001/0005133A1 teaches a similar method to that described in U.S. Pat. No. 4,737,698 but requires juxtaposition of the sensor's transmit and receive windings on either side of the target. In order for the arrangement to work to commercially attractive levels of measurement linearity (<0.5%) in modern industrial or automotive electromagnetic environments, the invention requires precise mechanical arrangement and electromagnetic shielding. This makes the invention expensive to produce and limits its commercial application.

The present invention encompasses the concept of a low cost, high speed, lightweight, accurate and robust device which can be readily manufactured to detect the relative positions of two or more bodies and which is applicable to a variety of topologies. It has particular but not exclusive relevance to arrangements which require a displacement measurement of a compact body along a relatively large distance.

SUMMARY OF THE INVENTION

In a preferred embodiment, a detector is provided for measuring relative position along a measurement path comprising: a passive, laminar electrical intermediate device extending along the measurement path wherein the extent of the said electrical intermediate device in an axis normal to the measurement path varies along the measurement axis; at least one laminar transmit winding and at least two laminar receive windings wherein the said at least two laminar receive windings are displaced from each other along the measurement path wherein each laminar receive winding is substantially electrically balanced with respect to the at least one laminar transmit winding; arranged such that the mutual inductance between at least one laminar transmit winding and at least two laminar receive windings indicates the relative position of the electrical intermediate device.

Preferably, the EID is produced from a magnetically permeable or an electrically conductive material.

Preferably, the EID comprises a pattern of holes or notches in a metal or magnetically permeable sheet.

Preferably, the EID comprises a series of winding loops arranged along the measurement axis such that induced voltages in adjacent loops oppose each other.

Preferably, the transmit and receive windings are embodied as tracks on a multilayer printed circuit board.

Preferably, the EID is embodied as a series of patterns, shapes or tracks on a printed circuit board.

Preferably, the transmit and receive windings are electrically balanced with respect to each other.

Preferably, the transmit and receive windings are arranged as electrical quadropoles so that signals received from the far field are negated.

Preferably, the transmit and receive windings are backed by a conductive shield.

Preferably, at least two receive windings are displaced from each other along the measurement axis by ¼ of the pitch the EID such that they form a sine and cosine receive winding and the transmit winding surrounds the receive windings.

Preferably, each receive winding comprises two counter wound loops with one loop displaced away from the EID.

Preferably, three receive windings are used each spaced apart along the measurement axis by one quarter the pitch of the EID.

Preferably, the third receive winding is used to subtract a fixed level of signal offset present in the other two receive windings.

Preferably, the detector is controlled by an electronics circuit which comprises a power supply, at least one transmit circuit, at least one receive circuit, a microcontroller and an electrical output.

Preferably, the detector is controlled by an electronics circuit which is constructed so that it is operable to control several sets of detectors.

Preferably, the electronics circuit comprises a microcontroller which may be programmed, configured or parameterized with data such as calibration values.

Preferably, the electronics circuit has a pulse output for high speed control and a high resolution output for lower speed position control.

Preferably, the EID's pattern is arranged as a repetitive, regular pattern over the displacement range.

Preferably, the detector measures position incrementally.

Preferably, the EID's pitch is aperiodic or irregular such that comparison of signals in the receive windings is uniquely indicative of the position of the two bodies over the displacement range.

Preferably, the EID's pattern is arranged as a multiplicity of regular repeating patterns of differing pitch displaced orthogonal to the measurement axis so as to form a Vernier style of pattern.

Preferably, the detector measures position absolutely.

Preferably, the detector measures position along one of a linear axis, a rotary axis, a curvilinear axis, a helical axis.

Preferably, the detector's electronic circuit comprises a temperature measurement system so that displacement measurements may be corrected to counteract thermal expansion or contraction of the EID, transmit windings, receive windings, associated mechanical supports or thermal drift of the electronics circuit.

Preferably, the temperature measurement system measures the resistance of a conductor which runs along the EID or alongside the transmit and receive windings, whose resistivity is dependant on temperature.

BRIEF DESCRIPTION OF THE DRAWINGS

In the accompanying drawings;

FIGS. 6a, 6b & 6c show various patterns of shapes for the EID.

DESCRIPTION OF THE PREFERRED EMBODIMENT

Figure 1:
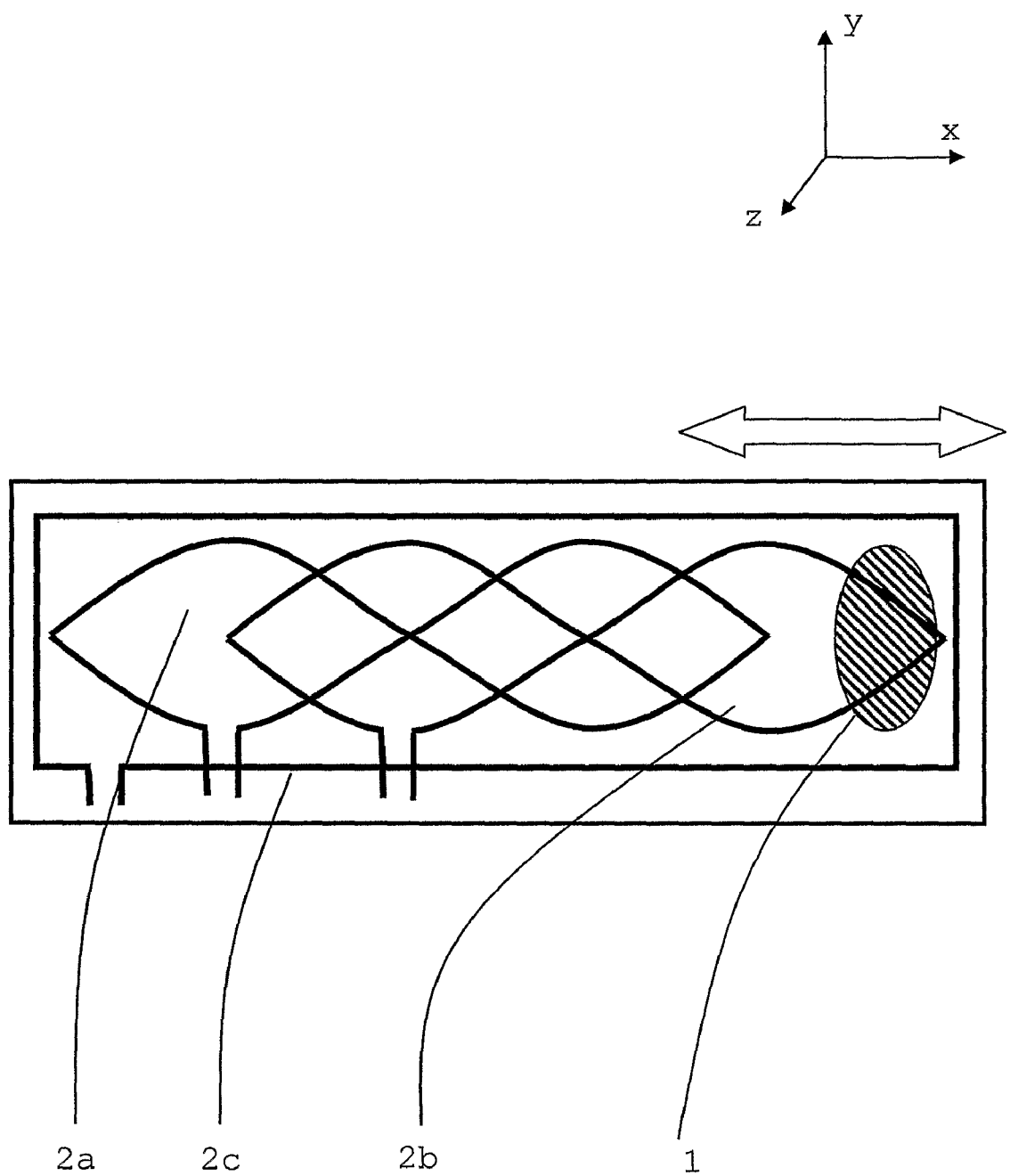
FIG. 1 shows a plan view schematic of a known form of inductive detector.
Figure 2:
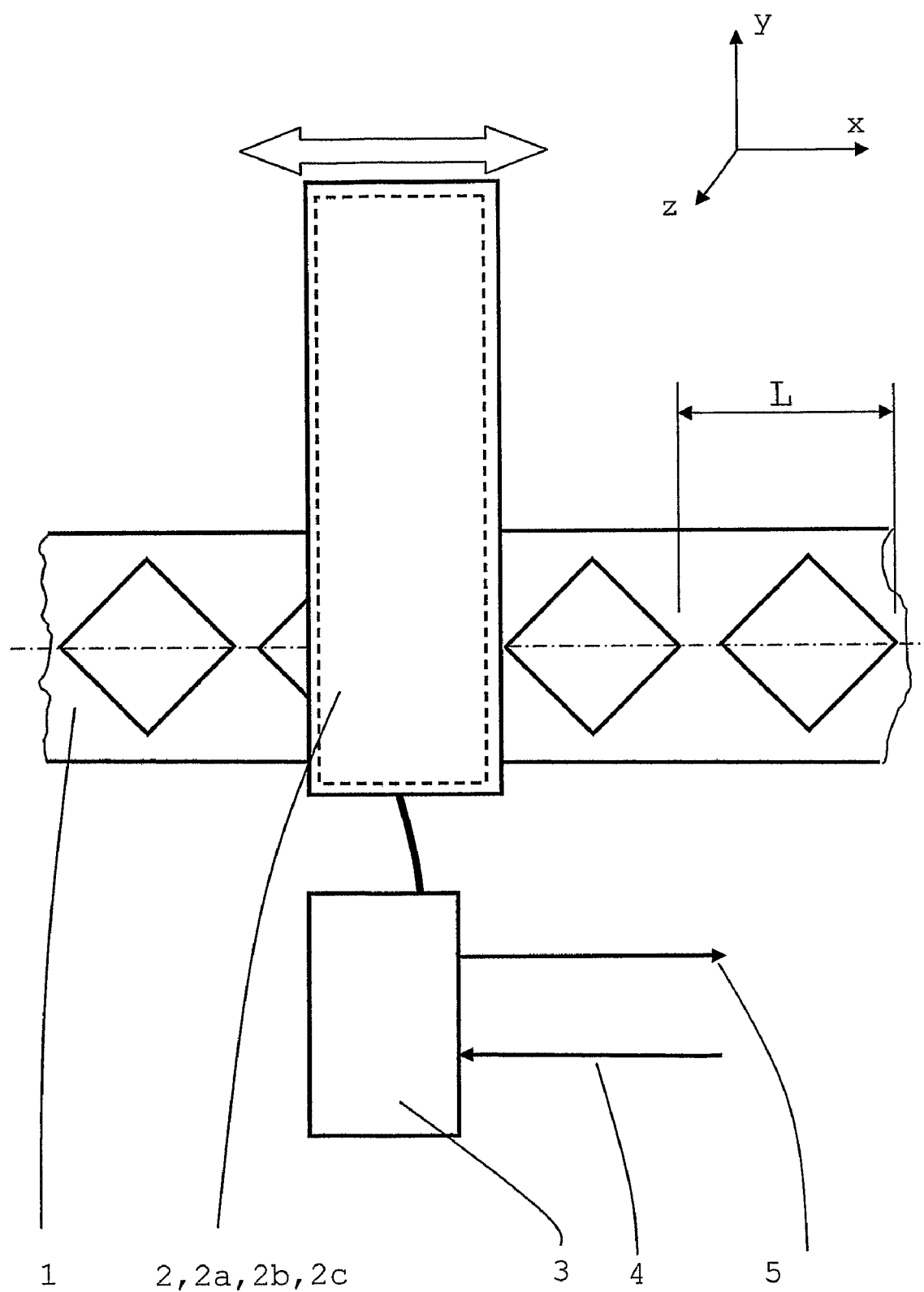
FIG. 2 shows a plan view of a linear form of the detector.

FIG. 2 shows a simplified plan view of the detector. An antenna [2] is arranged to move along an axis (x) relative to a laminar EID [1]. The antenna [2] comprises a transmit winding [2c] surrounding two receive windings [2a & 2b]. The winding arrangement is described in more detail later. The receive windings [2a & 2b] are spaced along the measurement (x) axis relative to each other. The transmit winding [2c] is energised from a power supply [4] via an electronics circuit [3] which generates a high frequency AC signal preferably in the range 10 kHz to 10 MHz. Consequently, the transmit winding [2c] forms an AC electromagnetic field which envelopes at least a portion of the EID [1]. The EID [1] is produced from a magnetically permeable or electrically conductive material and extends along the measurement axis (x-axis) in a plane and is patterned along its length with a series of rectangular holes so that its effective extent varies along the axis. Preferably the EID [1] is produced from punched metal strip such as 16 SWG passivated mild steel. Preferably, the windings [2a, 2b & 2c] are formed as tracks on a laminar, double-sided printed circuit board such as 0.8 mm thick, FR4 with 1 ounce copper and where the electrical insulation at any cross overs of the winding conductors is enabled by plated via holes. Each of the receive windings [2a & 2b] is wound in 2 loops of opposing polarity and of substantially the same area with one loop displaced away from the EID [1] in the y-axis. This provides electrical balance between the transmit windings [2c] and receive windings [2a & 2b] so that no signal appears at the receive windings [2a & 2b] in the absence of an EID [1]. The receive windings [2a & 2b] are displaced along the measurement axis relative to each other by ¼ the pitch distance [L] of the EID [1]. As the antenna [2] moves along the axis, the mutual inductance (i.e. the inductive coupling) between the transmit [2c] and receive windings [2a & 2b] varies according to the position of the antenna [2] relative to the EID [1]. When maximum coupling occurs in the first winding [2a], the coupling in the second winding [2b] is at its mean value. The received voltages [$V_{ra}$ & $V_{rb}$] form a sinusoidal and cosinusoidal variation (each with an offset of substantially equal magnitude) along the x-axis by virtue of the shaped EID. The receive windings [2a & 2b] need only be simple rectangular coils. Once any offsets are subtracted from both signals the position of the antenna [2] relative to the EID [1] may be determined by a simple arctan calculation. (A simple method for subtraction of the offsets using a third receive winding will be described later). Since the signal $[V_{ra}]$ in the first winding [2a] is proportional to sin(x)+offset and the signal $[V_{rb}]$ in the second winding [2b] is proportional to cos(x)+offset, then the position 'x' of the windings along a shape can be obtained from the equation (L/2pi)*ARCTAN $((V_{ra}-\text{offset})/(V_{rb}-\text{offset}))$. Given the multiplicity of regularly repeating shapes along the axis the reading is ambiguous. This may be converted to an absolute position measurement by the electronics circuit [3] incrementing or decrementing a count held in software each time an individual shape is passed. Whilst the bodies in FIG. 2 are arranged so as to move principally in a single linear axis (x) it is important to note that the invention is not restricted to linear motion. The antenna [2] is electrically connected to an electronic circuit [3] which is energised by an electrical power supply [4] and outputs electrical signals [5] in accordance with the relative position of the antenna [2] and EID [1]. Preferably, the electrical outputs are in 2 forms—a high speed, digital, relatively coarse position measurement (such as a pulse train) to indicate when shapes have been passed at high speed and a lower speed, high resolution signal to indicate position relative to individual shapes at low speed. The combination of such signals is beneficial to speed control at high speeds and precise position control at slow speeds respectively. High resolution electrical outputs [5] from the electronic circuit [3] can be, for example, serial data such as SPI, voltage such as 0-5 VDC or current such as 4 . . . 20 mA. A power supply [4] to the electronics circuit of 5 VDC with a current of 10 mA is preferable. Preferably, the detector's printed circuit boards for the antenna [2] and electronics circuit [3] are protected from humidity and fluids with a sprayed conformal coating such as Plastic Seal 60 from Servisol Ltd. of Bridgwater, Somerset, England.

Figure 3:
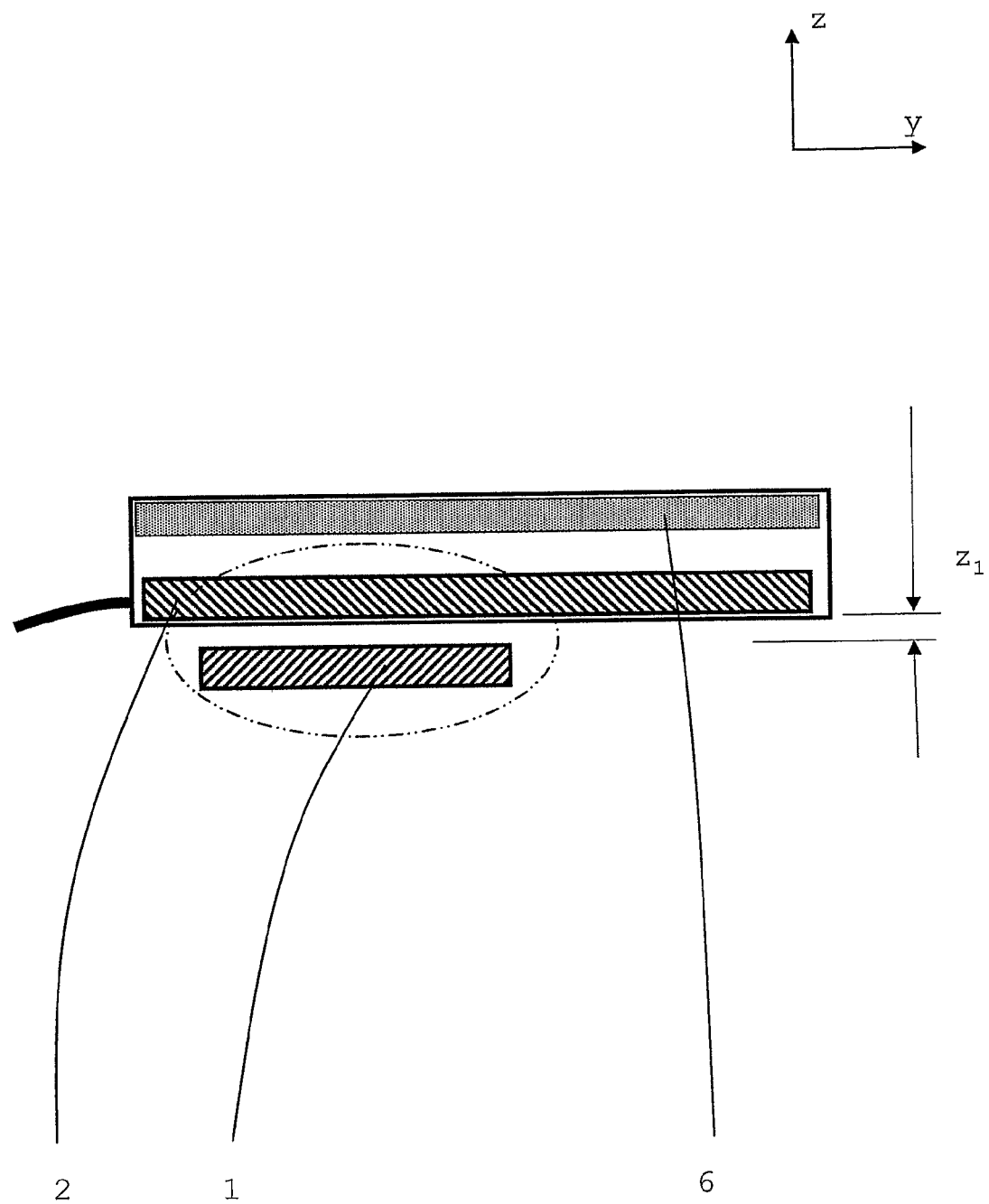
FIG. 3 shows a section through a linear form of the detector.

FIG. 3 shows an end elevation of the arrangement previously descried in FIG. 2. Preferably, the field emitted by the antenna [2] encompasses the EID [1] but does not extend far beyond for reasons of good electromagnetic compatibility, but sufficiently far to ensure that any small variations in the z and y axes do not produce measurement errors. Preferably the antenna [2] is covered by a conductive shield [6] which partially protects the antenna [2] from far field emissions and limits the extent of the field past the EID [1]. Preferably, the stand off distance $(z_1)$ should be kept as small as practically possible. For an EID [1] of nominal 25 mm width and a pattern pitch distance [L] of 25 mm a stand off distance of 1 mm to 2 mm is well suited. The distance of the shield [6] from the antenna [2] should be at least as large as the distance between antenna [2] and EID [1]. Given that the measurement algorithm is ratiometric, any slight variation in the stand-off distance $[z_1]$ will not, within limits, have significant effect on measurement performance. This is advantageous in permitting generously toleranced and hence inexpensively produced mounting arrangements.

Figure 4:
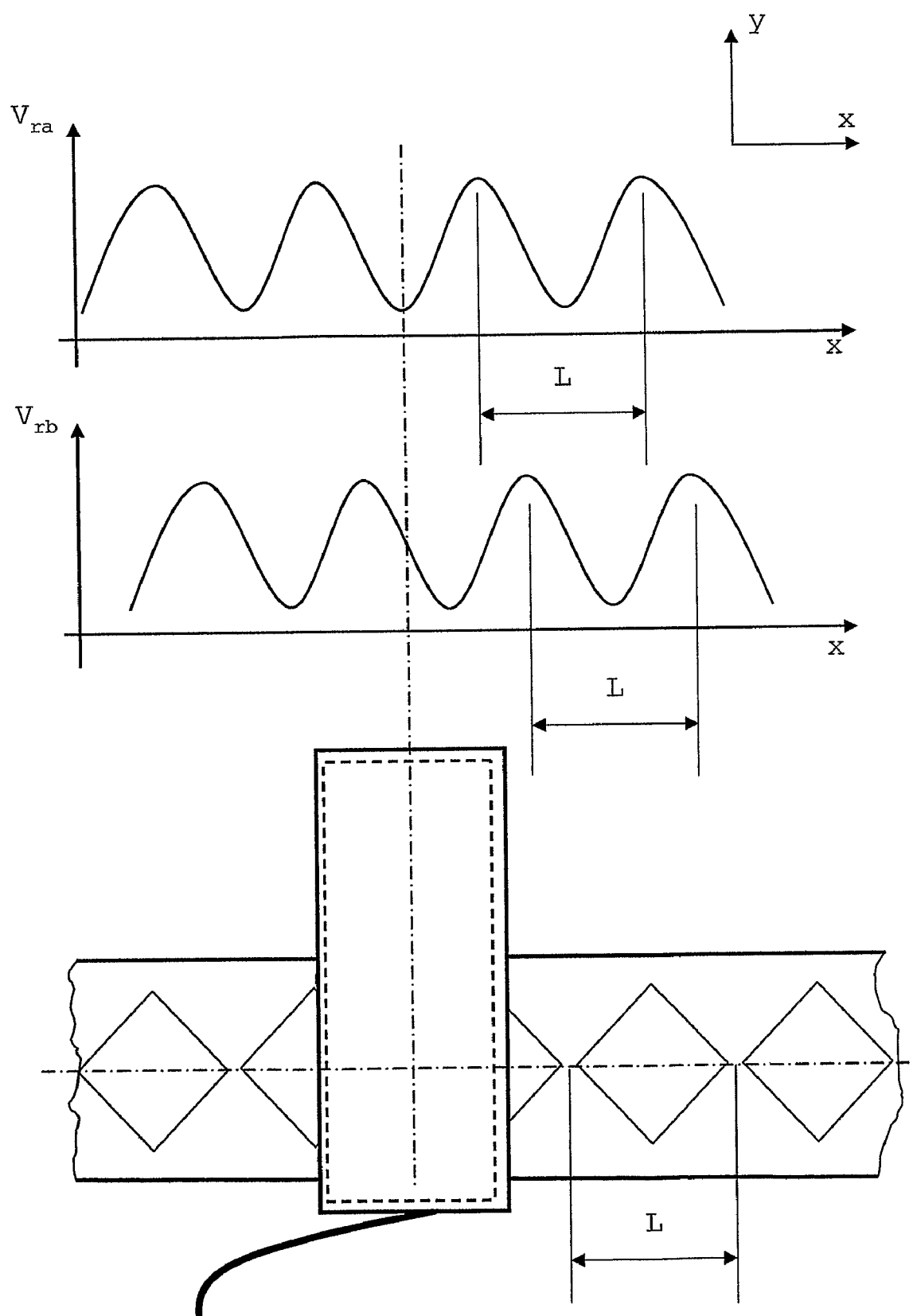
FIG. 4 shows a plan view of the detector and a graphical schematic of the voltages induced in two receive windings.

FIG. 4 shows graphs of the variation in the receive windings voltages ($V_{ra}$ & $V_{rb}$) as the antenna [2] moves along the EID [1].

Figure 5:
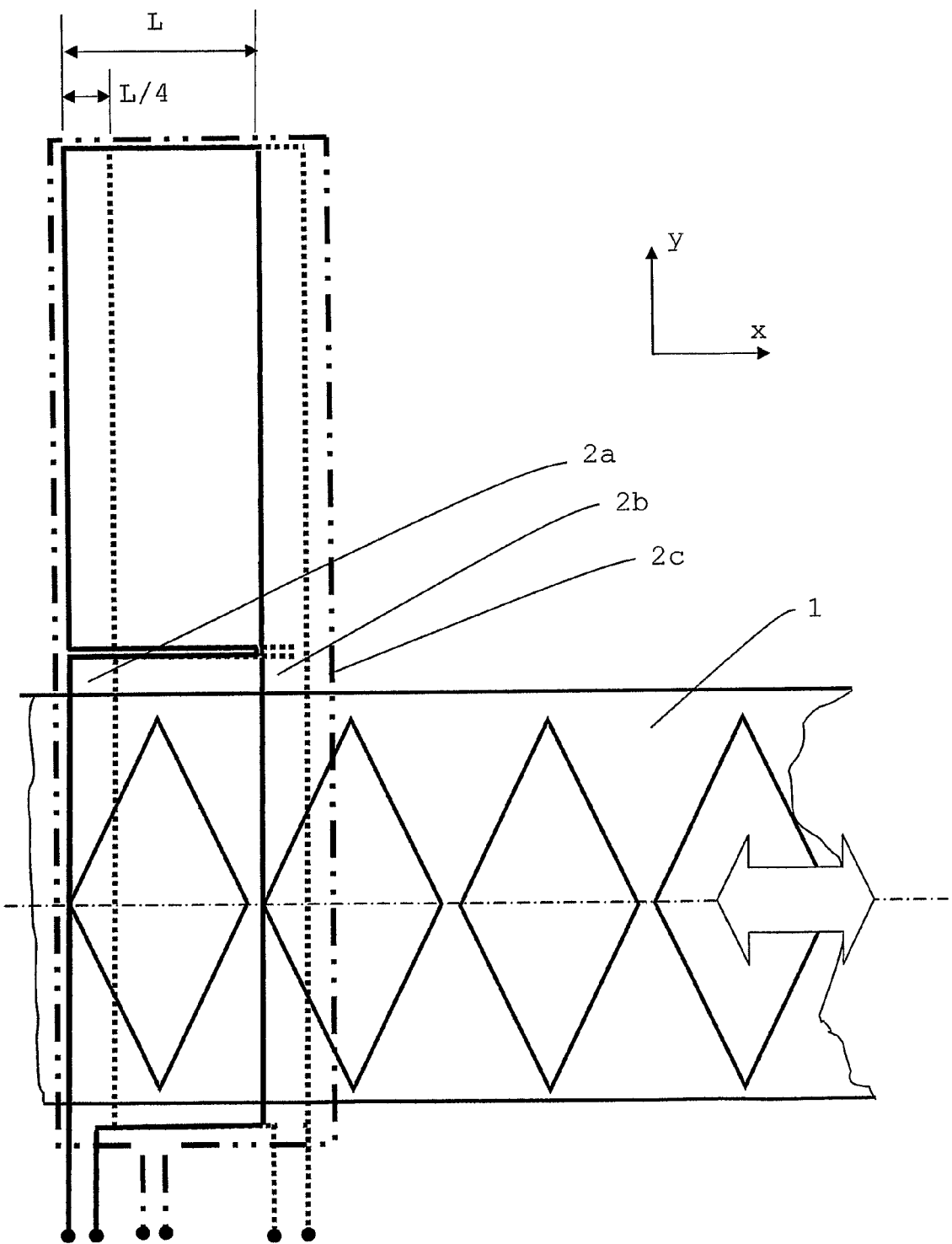
FIG. 5 shows a schematic arrangement of the antenna with 3 windings.

FIG. 5 shows a simplified schematic arrangement of the antenna [2] and EID [1]. The transmit winding [2c] encloses the two receive windings [2a & 2b]. The receive windings [2a & 2b] are spaced apart along the measurement axis. One loop of each of the receive windings [2a & 2b] interacts with the EID [1]. Another loop of substantially the same area but wound in an opposing direction to the first loop extends off to one side in the y-direction. This counter winding arrangement ensures that any signals received from the far field will be negated and that only signals resulting from inductive interaction with the EID [1] are present. In FIG. 5 the first receive winding [2a] is shown with a first loop wound in a clockwise direction and the second loop wound in an anti-clockwise direction. The second receive winding [2b] is spaced along the measurement axis from the first by a quarter pitch [L/4]. Each winding is essentially of uniform width along the x-axis. FIG. 5 shows a relatively simple arrangement for reasons of clarity. In practice, it is useful to construct winding arrangements consisting of more turns in order to minimise space and material requirements. Furthermore, the physical area of the windings need not be the same only their effective electrical area. The physical area of the second loops may be reduced by increasing the number of turns so as to provide an equivalent electrical area. Cross over points can be positioned to ensure that a minimum number of PCB layers are required. Preferably, the transmit winding [2c] is electrically balanced with respect to the receive windings [2a & 2b]. Electrical balance between transmit [2c] and receive windings [2a & 2b] may be achieved by adjusting the transmit circuit's [2c] length, width and centre position. Although not shown for reasons of clarity, the transmit winding [2c] may also be formed as a quadropole to reduce electromagnetic emissions. Preferably an opposing polarity loop is formed away from the receive windings [2b & 2c] and EID [1] in the y-direction.

FIGS. 6a, 6b & 6c show various forms which may be used on the EID [1] as a method of varying the effective electrical extent or width. FIG. 6a shows a pattern of hexagons in a row. Such a pattern may be produced by notching or profiling the edges of a metal strip. 6b is a series of round holes in a strip which may be produced by drilling, punching, laser or water jet cutting. Other shapes of hole might include square (as shown in FIG. 6c), rectangular, pentagonal, hexagonal etc.— i.e. any shape hole which when repetitively spaced along the EID [1] would cause a variation in the inductive coupling of the windings as they pass over it. It is important to note that the EID's key parameter is the variation in its 'effective' or electrical width (i.e. ability to couple energy from transmit to receive windings) which does not necessarily mean variation in its actual external extent or width dimension. The effect of extent variation can indeed be achieved by an EID whose external width varies but the same effect of extent variation may also be achieved by patterns of holes in a laminate of generally uniform cross section; patterns of solid conducting areas on an insulating substrate of generally uniform cross section; cross hatching or a winding (such as a conductor on a PCB) whose width varies on an insulating substrate of generally uniform section etc.

Figure 7:
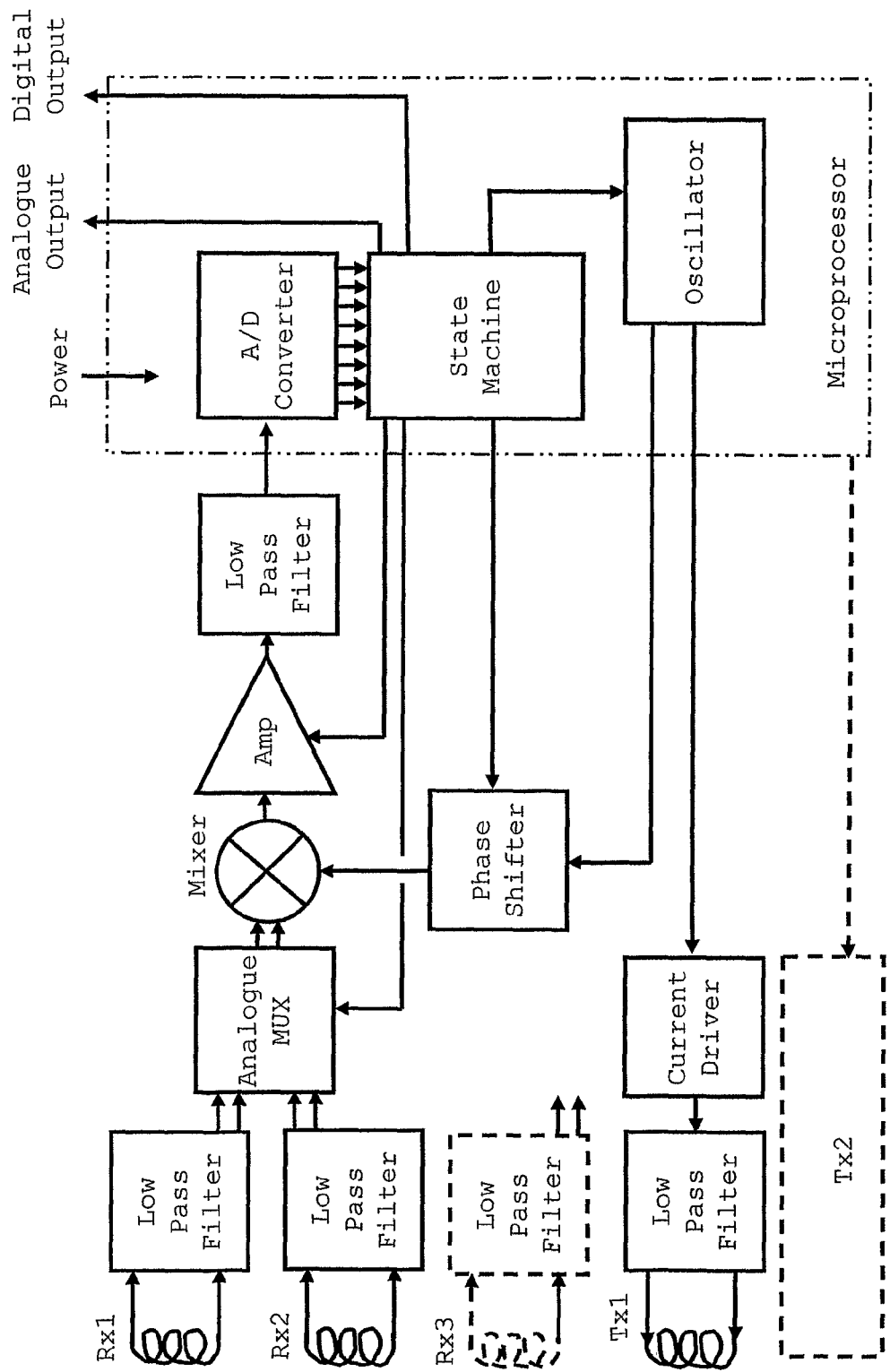
FIG. 7 shows a schematic of the detector's electronic circuit.

FIG. 7 shows a schematic of the electronic circuit [3] which is largely self explanatory. In addition, the power supply may pass through an over voltage protection circuit if voltage spikes are possible from the host equipment's electrical supply. Reverse polarity protection (not shown for reasons of clarity) is also a common requirement. Preferably, the circuit [3] is constructed from an application specific integrated circuit. Alternatively, a circuit of surface mount electronics is provided and preferably soldered to the same printed circuit board as the antenna [2] with as short a distance as possible between the circuit [3] and the antenna's windings [2a, 2b & 2c]. The high speed pulse output circuit is not shown in FIG. 7 for reasons of clarity. For the highest speeds, the analogue multiplexer is removed and separate receive amplifier channels are used.

MODIFICATIONS AND FURTHER EMBODIMENTS

Thus far, the various embodiments have used a simple, periodic, regular variation of the EID's [1] extent along the measurement axis which provides a simple incremental measurement. One draw back of periodic arrangements is that the measured position is ambiguous rather than absolute. Absolute position measurement can be achieved in a number of ways.

A first method to obtain absolute position measurement is to use a second, single coarse pitch arrangement of a second EID [1] extending over the full scale. In this way an approximate position can be ascertained using readings from the coarse scale and a fine resolution reading taken from the fine scale. The same concept can be extended to cover a Gray or binary scale.

Figure 8:
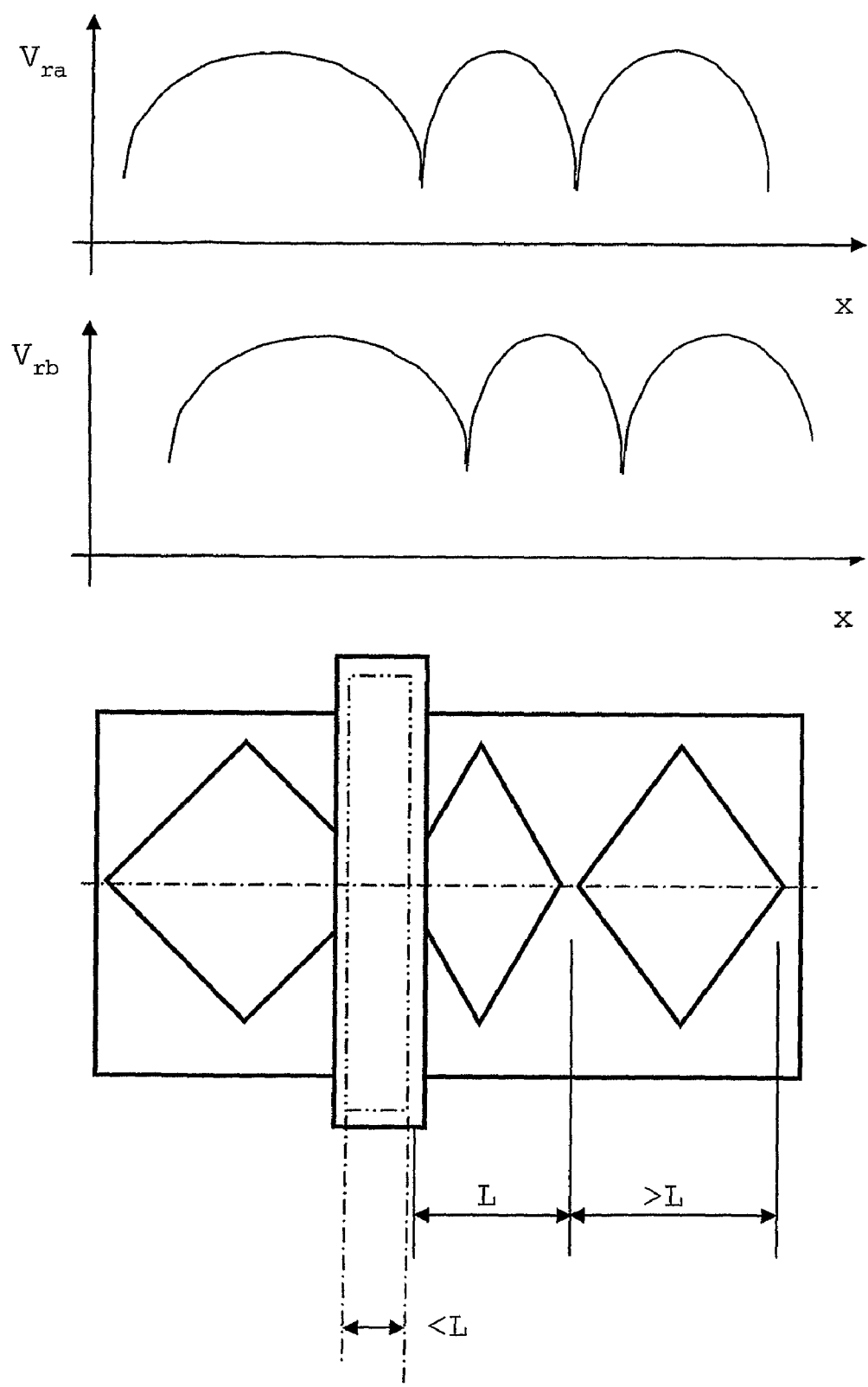
FIG. 8 shows a linear form of the detector with an irregular pattern of shapes on the EID.

A further method to obtain absolute measurement is by the use of an aperiodic or irregular pattern. Such an aperiodic arrangement of the EID [1] is shown in FIG. 8. In this aperiodic arrangement, the pitch of the holes varies along the measurement axis such that comparison of the voltages in the received windings [2a & 2b] is unique at any point along the full scale. The use of a third receive winding, further displaced along the measurement axis from the other two windings is beneficial for good linearity.

Figure 9:
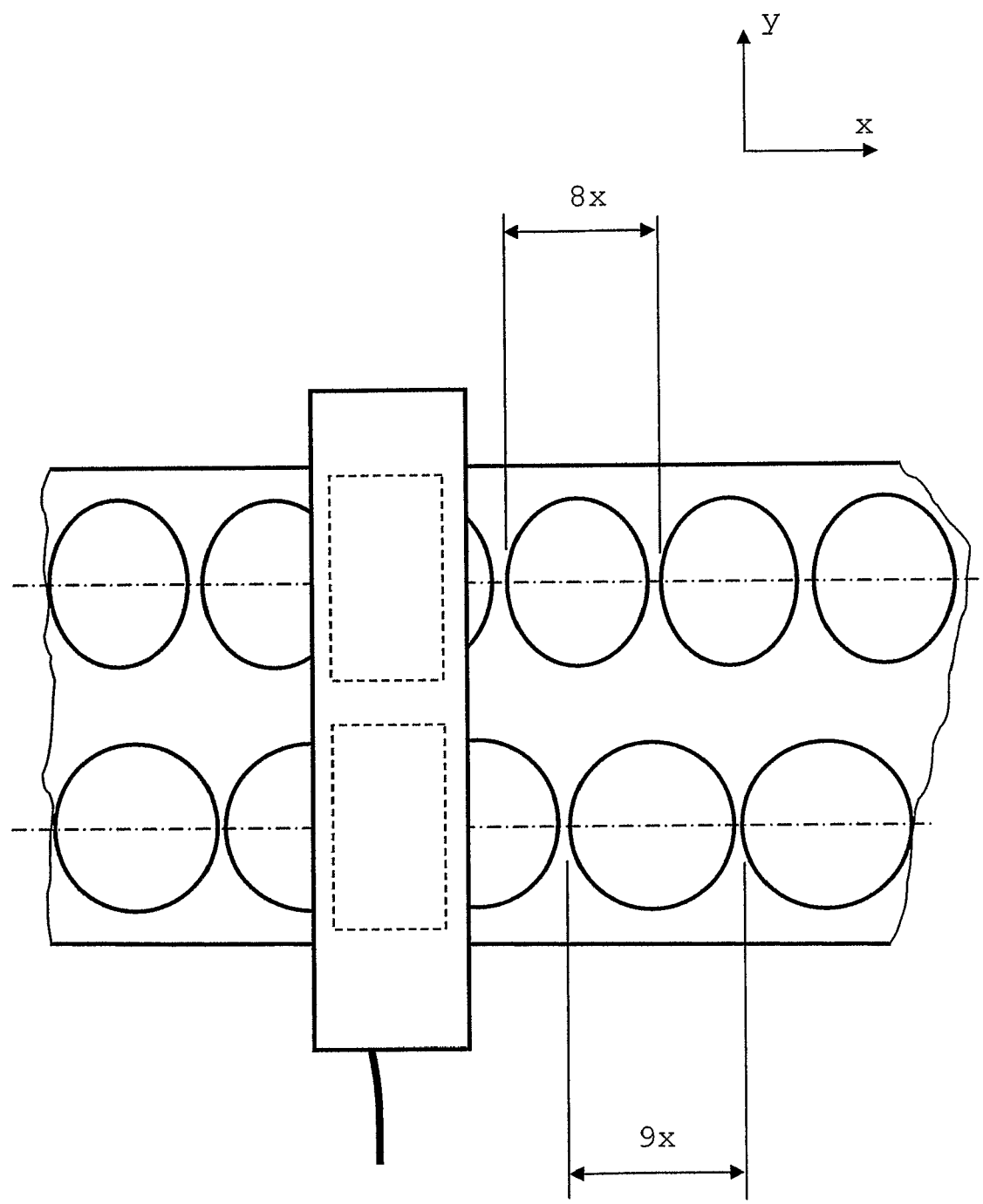
FIG. 9 shows a linear form of the detector with a Vernier pattern of shapes on the EID.

A further method to obtain absolute measurement is to use a Vernier technique. A schematic of such an arrangement is shown in FIG. 9. This technique uses two or more multi-pitch periodic patterns on the EID [1]. For example, a first series of holes of pitch 8x is used with a second series of pitch 9x. The ambiguous readings from each pattern can be combined so as to provide a unique indication of position. The unique indication will be preserved up to the lowest common multiple of the pitches. In this example the lowest common multiple is 72x. This length may be extended by choosing different pitches such as 25x & 26x or by a third pattern and so on.

There is a variety of permutations and combinations of these techniques to provide absolute measurement.

Other higher harmonic components with respect to the fundamental pitch of the EID [1] may be added to the pattern on the EID [1] to improve linearity.

The detector may be deployed in a variety of geometries including linear, rotary, curvilinear and 2-dimensional.

The displacement of the receive windings [2a & 2b] is not necessarily L/4 for an EID [1] pattern of pitch L. This dimension was described previously for reasons of simplicity so as to make clear the possible use of simple arctan calculations performed on the two received signals [$V_{ra}$ & $V_{rb}$]. It was also previously observed that the simple arctan calculation would require subtracting the voltage offsets from each of the two received voltages. There are various ways in which the offsets may be taken out. One simple method is the use of a third receive winding similar to the first two [2a & 2b] but spaced at a L/2 pitch distance along the measurement axis from the first receive winding [2a] and so L/4 pitch distance from the second receive winding [2b]. The mean received voltage from the first winding [2a] and the third winding represents the offset voltage.

The EID [1] pattern is shown to vary smoothly in previous embodiments, however this is not necessary and can be approximated to by using largely rectangular or nested rectangular holes or shapes.

There is no absolute size limitation to the invention. The limits are only set by limits of manufacturing processes rather than physical laws. At one extreme, very long or large EIDs [1] can be produced by manufacturing methods such as, but not limited to, pressing or blanking steel strip; laser cutting steel; electro-deposition on to ceramics or glass; printing of conductive inks on to insulating substrates; self adhesive metallised disks stuck to an insulating substrate etc. At the other extreme, very small detectors can be produced using micromachining methods or small scale photo-lithography methods. These small scale devices are particularly advantageous when the antenna [2] and electronics circuit [3] are embodied on a single application specific integrated circuit.

A variety of substrate materials enable the detector to work in a wide range of environments. Glass is particularly suitable given its stability and low co-efficient of thermal expansion. Notably, substrates with this invention may be encapsulated in a protective plastic shield.

In high accuracy applications, the thermal expansion and contraction of the detector's components can lead to measurement error and hence loss of accuracy. These thermal errors may be counteracted by measuring temperature and feeding in a corresponding temperature coefficient to the position calculation carried out in the electronic circuit [3]. Advantageously, the temperature may be found by measuring the resistance of a conductive track on the antenna [2]. In this way the average temperature adjacent to the EID [1] may be measured rather than in a local hot or cold spot as might be experienced by a traditional thermocouple, for example.

The EID [1] does not need to be rigid. If the conductive pattern is deposited on a flexible substrate such as Mylar or polyester the EID [1] may be deployed in more complex geometries; coiled up and unwound or stuck down to complex surfaces or profiles.

To a significant extent, variation in the position of the EID [1] relative to the antenna [2] in axes other than the main measurement axis does not affect the measured value. In particular, the stand off distance [$z_1$] between EID [1] and antenna [2] in the z-axis can vary without altering the measured displacement (x). The range of acceptable variation can be extended by bracketing the amplification factors used in the electronics circuit [3] according to the amplitude of the received signals [$V_{ra}$ and $V_{rb}$]. If the EID [1] to antenna [2] distance is large then the amplitude of received signals [$V_{ra}$ and $V_{rb}$] will be small and large amplifications should be applied. The converse applies if EID [1] to antenna [2] distance is small.

Thus far the detector has mostly been described using one transmit winding [2c] and two receive windings [2a & 2b]. As will be appreciated by those skilled in the art, there is a variety of further permutations and arrangements of windings in the antenna [2] including, but not limited to, windings arranged on either side of the antenna substrate or all on the same side of the laminar antenna [2] and separated orthogonally to the measurement axis. Arranging the antenna [2] windings on either side of the EID [1] is not preferred due to the restrictions that such an arrangement places on mechanical mounting. For simplicity of construction, minimal cost and good measurement performance, an arrangement of EID [1] substantially in one plane and the antenna [2] substantially in a second plane, facing the EID [1] is preferred. Further, there are other possible excitation and position calculation techniques such as the use of a high frequency excitation frequency modulated by a lower frequency signal so as to provide lower speed signal processing. This is not preferred due to its relatively low speed of operation and higher complexity. A further embodiment is to swap the transmit and receive functions whereby the transmit winding described thus far becomes the receive winding, and the receive windings described thus far become transmit windings. A still further embodiment uses the phase of the received signals rather than amplitude.

Multiple EIDs [1] may be constructed on the same physical unit of printed circuit board by simply displacing patterns away (in the y or z axis) from each other and avoiding electrical connection. Such constructions are particularly advantageous in detectors for safety related environments where electrical redundancy is necessary. In an electrically redundant system a multiplicity of EIDs [1] may be formed on the same piece of substrate and they may be concurrently detected using a multiplicity of antennae [2], each antenna [2] being controlled by its own electronic circuit [3].

There are many applications for the invention including, but not limited to: actuators, aileron controls, angle sensors, radar antenna tracking, anti-counterfeit devices, audio controls, automatic guided vehicles, automatic teller machines, automation equipment, ball screws, boilers, brake sensors, brake wear sensors, burners, climate controls, cockpit controls, component identification, consumer electronics, cookers, cooking ranges, cooktops, dials, direction indicators, dishwashers, displacement sensors, door travel sensors, elevators, end of shaft encoders, fitness equipment, flow sensors, food mixers, fuel level sensors, fuel metering, games, gauges, giant magnetoresistive sensor replacements, guided vehicle tracking, gunnery sights, Hall affect replacements, headlamp level controls, HVAC sensors, hydraulic actuators, hydraulic valves, identification tags, impellers, inclinometers, indexing tables, indicator gauges, Inductosyn replacements, industrial control panels, joysticks, kitchen goods, lifts, lighting controls, limit switch replacements, linear actuators, liquid level sensors, load sensors, LVDT replacements, machine tools, magnetostrictive sensor replacements, marine engines, marine equipment, mining equipment, missile guidance, motion controllers, motor encoders, odometers, packaging equipment, palletisers, paper thickness sensors, pedal sensors, pen sensing, petrochemical sensors, plotter controls, pneumatic actuators, pneumatic valves, pressure sensors, printer write heads, PRNDL sensors, proximity sensors, push buttons, radar controls, ride height sensors, robots, roll/pitch/yaw sensors, roller separation sensors, rotary encoders, RVDT replacements, safety switches, seating instrumentation, security tags, servo motors, shaft encoders, sheet feeders, skis, sliders, speed sensors, sports equipment, steering angle sensor, steering column controls, stepper motors, strain measurement, suspension dampers, suspension sensors, tachometers, tamper evident devices, throttle controls, tilt sensors, torque sensors, toys, traction control, transmission sensors, turbines, user interface elements, utility meters, valves, velocity sensors, vibration sensors, washing machines, weight sensors, wheel sensors, workpiece identification.

The invention claimed is:

1. An inductive detector for measuring relative position along a measurement path, comprising:
    a passive, laminar electrical intermediate device extending along the measurement path wherein the extent of the said electrical intermediate device in an axis normal to the measurement path varies along the measurement axis;
    at least one laminar transmit winding and at least two laminar receive windings wherein the said at least two laminar receive windings are displaced from each other along the measurement path wherein each laminar receive winding is substantially electrically balanced with respect to the at least one laminar transmit winding;
    arranged such that the mutual inductance between at least one laminar transmit winding and at least two laminar receive windings indicates the relative position of the electrical intermediate device, and
    wherein each laminar receive winding comprises at least one loop which is substantially unaffected by displacement of the laminar electrical intermediate device.

2. A detector as claimed in claim 1 wherein each laminar receive winding comprises at least loops wound in opposite directions.

3. A detector as claimed in claim 1 wherein the laminar transmit and laminar receive windings are substantially coplanar and in a plane substantially parallel to the laminar electrical intermediate device.

4. A detector as claimed in claim 1 wherein the laminar transmit and laminar receive windings are conductive tracks on a printed circuit board.

5. A detector as claimed in claim 1 wherein the electrical intermediate device is chosen from the list consisting of a metal sheet; conductive sheet; magnetically permeable sheet; and conductive pattern on an insulating substrate.

6. A detector as claimed in claim 1 wherein the variation in extent of the electrical intermediate device is periodic.

7. A detector as claimed in claim 6 wherein the measurement method is incremental.

8. An inductive detector for measuring relative position along a measurement path, comprising:
    a passive, laminar electrical intermediate device extending along the measurement path wherein the extent of the said electrical intermediate device in an axis normal to the measurement path varies along the measurement axis;
    at least one laminar transmit winding and at least two laminar receive windings wherein the said at least two laminar receive windings are displaced from each other along the measurement path wherein each laminar receive winding is substantially electrically balanced with respect to the at least one laminar transmit winding;
    arranged such that the mutual inductance between at least one laminar transmit winding and at least two laminar receive windings indicates the relative position of the electrical intermediate device, and
    wherein the variation in extent of the electrical intermediate device is aperiodic.

9. A detector as claimed in claim 8 wherein the measurement method is absolute.

10. A detector as claimed in claim 1 wherein the variation in extent of the electrical intermediate device is in a Vernier arrangement comprising two patterns of different pitches.

11. An inductive detector for measuring relative position along a measurement path comprising:
    a passive, laminar electrical intermediate device extending along the measurement path wherein the extent of the said electrical intermediate device in an axis normal to the measurement path varies along the measurement axis;
    at least one laminar transmit winding and at least two laminar receive windings wherein the said at least two laminar receive windings are displaced from each other along the measurement path wherein each laminar receive winding is substantially electrically balanced with respect to the at least one laminar transmit winding;

arranged such that the mutual inductance between at least one laminar transmit winding and at least two laminar receive windings indicates the relative position of the electrical intermediate device, and wherein the variation in extent of the electrical intermediate device has a coarse pitch and fine pitch.

12. A detector as claimed in claim 1 wherein the variation of the electrical intermediate device's extent is produced by a hole whose shape is chosen from the list consisting of circle, ellipse, triangle, rectangle, pentagon, hexagon, sinusoid, and polygon.

13. A detector as claimed in claim 1 wherein a temperature compensation factor is calculated from the electrical resistance of a laminar winding.

* * * * *